United States Patent [19]

Welch

[11] Patent Number: 4,509,881
[45] Date of Patent: Apr. 9, 1985

[54] SPINDLE MOUNTING BASE

[75] Inventor: Thomas M. Welch, Cincinnati, Ohio

[73] Assignee: Duplex Lighting, Inc., Cincinnati, Ohio

[21] Appl. No.: 386,691

[22] Filed: Jun. 9, 1982

[51] Int. Cl.³ .............................................. F16B 7/00
[52] U.S. Cl. .................................. 403/229; 248/264; 256/65; 211/105.5
[58] Field of Search ...................... 248/264; 242/55.2; 256/65, 66, 67, 68, 69, 70; 403/229, 138, 76, 77, 7; 211/105.1, 105.5, 123

[56] References Cited

U.S. PATENT DOCUMENTS

| | | | |
|---|---|---|---|
| 565,075 | 8/1896 | Grant | 248/264 |
| 1,639,551 | 8/1927 | Booth . | |
| 3,280,527 | 10/1966 | Faust | 52/301 |
| 3,437,059 | 4/1969 | Stonier et al. | 108/151 |
| 3,712,011 | 1/1973 | Husler | 52/241 |
| 4,101,227 | 7/1978 | Herbenar et al. | 403/138 X |
| 4,188,758 | 2/1980 | Swann | 52/241 |

FOREIGN PATENT DOCUMENTS

| | | | |
|---|---|---|---|
| 382224 | 9/1923 | Fed. Rep. of Germany | 248/264 |
| 712157 | 7/1954 | United Kingdom | 248/264 |

Primary Examiner—Richard J. Scanlan, Jr.
Attorney, Agent, or Firm—Frost & Jacobs

[57] ABSTRACT

A spindle mounting base for detachably securing a spindle in a desired location, comprising a socket member having an opening configured to receive an end of the spindle, a plate within the socket member movable in a passage into abutment with the end of the spindle, and spring means urging the plate into engagement with the end of the spindle.

5 Claims, 5 Drawing Figures

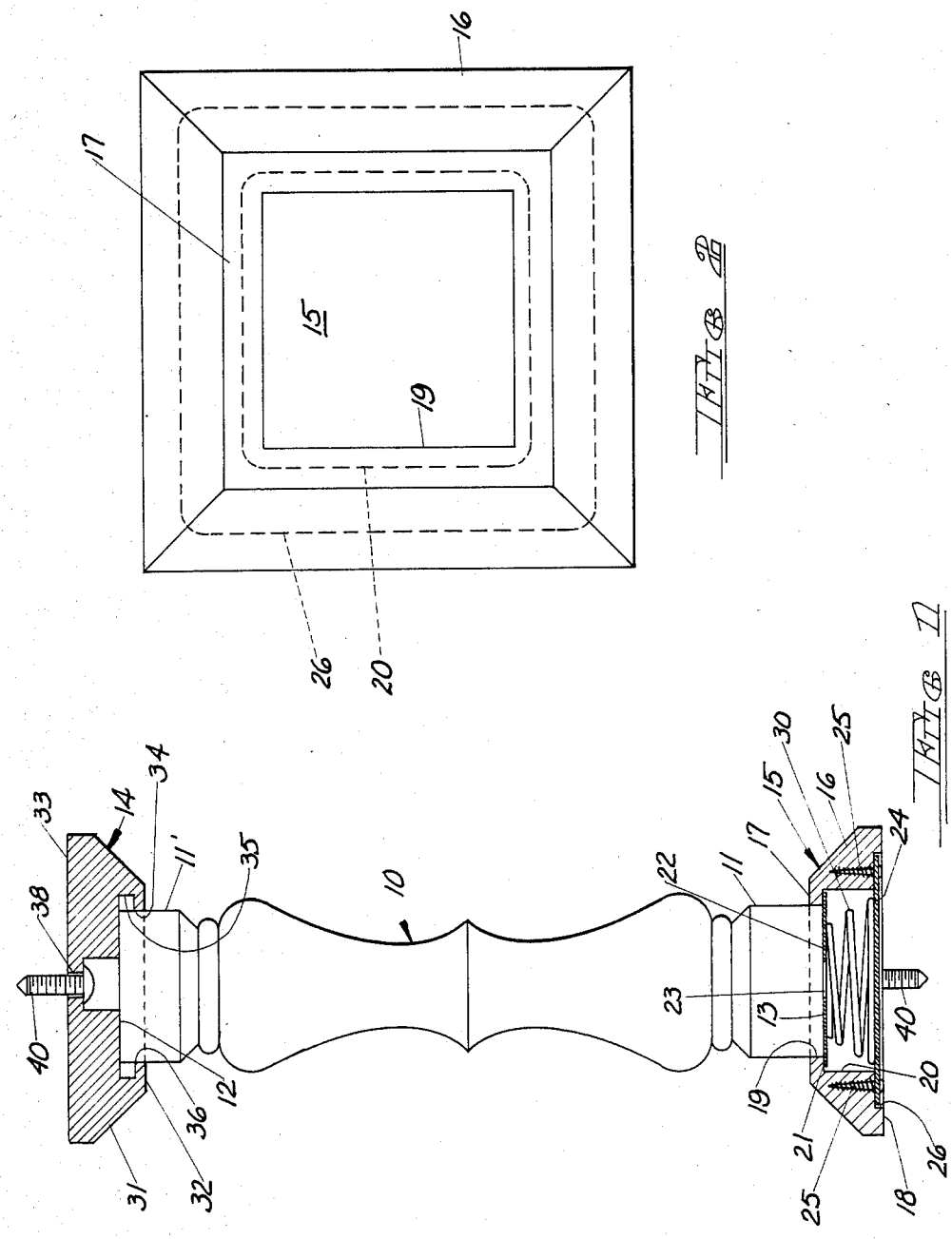

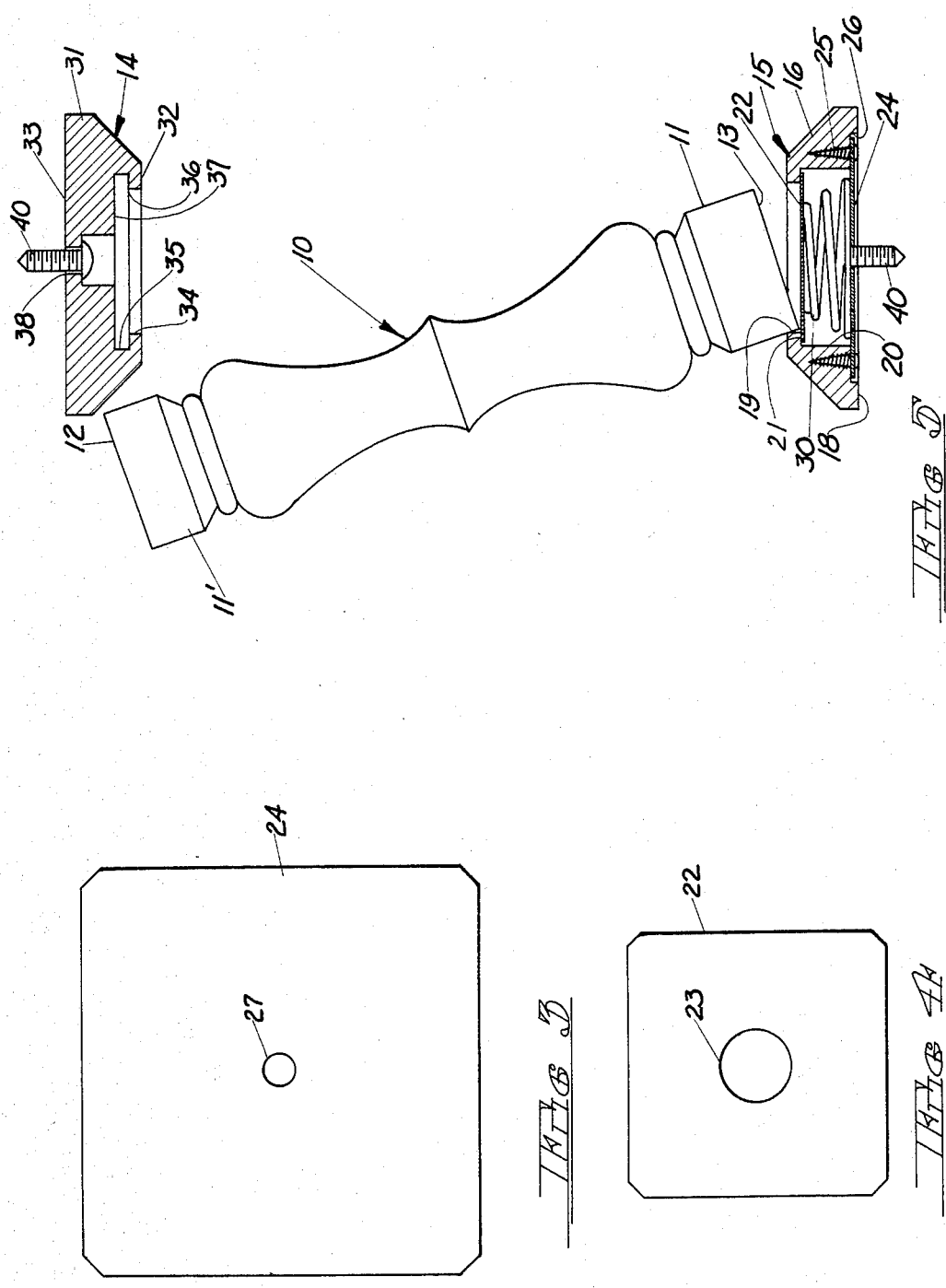

4,509,881

SPINDLE MOUNTING BASE

BACKGROUND OF THE INVENTION

The present invention relates to a base for releasably securing a spindle in a desired position and more particularly to a pair of bases cooperatively adapted for this purpose. The invention has particular utility in securing conventional spindles in existing structures or rooms, e.g. between a floor and a ceiling or in a horizontal railing.

While the general principle of releasably or detachably securing an elongated member, by means of a spring which exerts force longitudinally of the member in order to cause it to bear against an opposing surface is known, nothing has been suggested, to the best of applicant's knowledge, which would provide the capability of securing spindles in a desired location, particularly in an existing building, which provides a pleasing ornamental appearance and in a manner which does not expose spring means and associated elements to view in the completed assembly.

It is therefore an object of the invention to provide a base for releasably securing a conventional spindle in a desired location which upon installation will present a pleasing ornamental appearance and shield from view the means for securing the spindle.

It is a further object of the invention to provide a pair of bases for securing a spindle in a desired location which permits easy and simple installation and permits greater tolerance in cutting or trimming spindles to required length than in conventional installation methods.

SUMMARY OF THE INVENTION

According to the invention there is provided a base for releasably securing a spindle in a desired position, the spindle having planar top and bottom surfaces, said base comprising a socket member having substantially parallel, generally planar inner and outer surfaces when in the installed position, the perimeter of said inner surface in the installed position being less than the perimeter of said outer surface, an opening centrally of said inner surface dimensioned and configured to receive an end of said spindle, a passage centrally of said outer surface having a greater area than said opening in said inner surface, a shoulder having an inwardly facing right angle defining the intersection of said opening and said passage, a plate within said passage having substantially the same configuration as said passage and movable therein into abutment with said shoulder, a planar closure member secured to said outer surface of said socket member and underlying said passage when in the installed position, and spring means in said passage between said movable plate and said closure member urging said plate into engagement with said shoulder.

Preferably a pair of bases is provided, one base of the pair having the structure set forth above, and the other base of the pair comprising a socket member having substantially planar inner and outer surfaces when in the installed position, the perimeter of said outer surface in the installed position being greater than the perimeter of the inner surface, and an opening centrally of said inner surface dimensioned and configured to receive an end of the spindle, a recess within said socket member intersecting said opening and having a greater area than said opening, and a shoulder having an inwardly facing right angle defining the intersection of said opening and said recess, said recess terminating in a planar surface intermediate said inner and outer surfaces of said socket member.

The invention is further considered to include the combination of a pair of bases having the structure set forth above with a spindle having planar top and bottom surfaces.

BRIEF DESCRIPTION OF THE DRAWING

Reference is made to the accompanying drawing wherein:

FIG. 1 is a side elevation, partially in vertical section, showing a pair of bases embodying the invention with a conventional spindle installed therebetween;

FIG. 2 is a top plan view of a preferred socket member of the base of the invention;

FIG. 3 illustrates a preferred embodiment of a closure member of the base of the invention;

FIG. 4 illustrates a preferred embodiment of a plate within the base of the invention;

FIG. 5 is a side elevation, partially in vertical section, illustrating the manner of installing a spindle between a pair of bases embodying the invention.

DETAILED DESCRIPTION OF THE INVENTION

Referring to FIG. 1 of the drawing a conventional spindle is indicated generally at 10. As is customary the spindle is of turned wood having any of a variety of ornamental configurations. Ordinarily each end of the spindle is square in cross section as indicated at 11 and 11' and has a planar top surface 12 and planar bottom surface 13.

A pair of bases for securing spindle 10 releasably in a desired position is indicated generally at 14 and 15 respectively. As will be evident from FIGS. 1 and 5 the bases 14 and 15 are not identical in construction.

Referring first to base 15 (FIGS. 1, 2 and 5), this comprises a socket member 16 having a generally planar inner surface 17 and a generally planar outer surface 18 when in the installed position. The perimeter of inner surface 17 is less than the perimeter of outer surface 18.

An opening 19 is provided centrally of the inner surface 17, which is dimensioned and configured to receive the end 11 of spindle 10. Since the ends of conventional spindles are ordinarily square, the opening in inner surface 17 will be square and dimensioned to receive the end 11 of spindle 10 with slight clearance therearound. However, it will be understood that socket member 15 and the opening in inner surface 17 may be of a different shape (e.g. circular, rectangular or triangular) if the end 11 of spindle 10 is of a different shape.

A passage indicated at 20 is provided centrally of outer surface 18 having a greater area than the opening 19 in inner surface 17. Passage 20 intersects opening 19, a shoulder 21 having an inwardly facing right angle defining the intersection of opening 19 with passage 20. Passage 20 may not necessarily have the same configuration as that of opening 19.

A flat plate 22 (FIG. 4) is provided within passage 20 having substantially the same configuration as the passage and movable therein into engagement with shoulder 21 as shown in FIGS. 1 and 5. Preferably an access opening 23 is provided centrally of movable plate 22 in order to facilitate installation of a fastening means from the inner surface of the socket member, as will be described in detail hereinafter.

A planar closure member 24 (FIG. 3) is provided which is secured to the outer surface 18 of socket member 16 by conventional means as, for example, by a plurality of flatheaded screws indicated at 25. Preferably closure member 24 is countersunk in a relieved section 26 of outer surface 18 so as to be substantially flush therewith. A bore indicated at 27 in FIG. 3 is provided centrally of closure member 24 through which fastening means may be inserted to secure the base in a desired location, as will be described in detail hereinafter.

The base 15 is further provided with spring means indicated at 30 in FIGS. 1 and 5 interposed between plate 22 and closure member 24 within the passage 20. Spring means 30 acts upon plate 22 when closure member 24 is secured to outer surface 18, urging plate 22 against shoulder 21.

Referring next to base 14 (FIGS. 1 and 5) this comprises a socket member 31 having a substantially planar inner surface 32 and a substantially planar outer surface 33 when in the installed position. As in the case of base 15, the perimeter of outer surface 33 is greater than the perimeter of inner surface 32. Socket member 31 is further provided with an opening indicated at 34 centrally of the inner surface 32 dimensioned and configured to receive end 11' of spindle 10 with slight clearance therearound. The opening 34 will ordinarily be of the same configuration and dimensions as opening 19 in the base 15. A recess indicated at 35 is provided within socket member 31 intersecting opening 34, recess 35 having a greater area than opening 34. A shoulder 36 having an inwardly facing right angle defines the intersection of opening 34 with recess 35. The recess terminates in a planar surface 37 intermediate the inner surface 32 and outer surface 33.

Preferably a circular bore indicated at 38 is provided centrally of the outer surface 33, the bore being of less area than that of opening 34 and intersecting the recess 35. Bore 38 is adapted to accommodate fastening means which may be inserted therethrough for securing base 14 in a desired location.

While base 14 has been shown in an uppermost position and base 15 in a lowermost position in FIGS. 1 and 5, it will be understood that the location thereof may be reversed.

In order to install the combination of the pair of bases and a spindle, the bases are attached to the top and bottom mounting surfaces, e.g. a floor and a ceiling with the uppermost base vertically above the lowermost base. An adhesive may be used to attach the bases, or a flat head wood screw indicated at 40 may be inserted through the central bores 27 and 35, respectively. As indicated in FIG. 5, one end 11 of spindle 10 is inserted in opening 19 of base 15 and pressure is exerted manually upon plate 22 so as to depress it downwardly against the force of spring means 30. The clearance is so selected as to permit the opposite end 11' of spindle 10 to snap into opening 34 in base 14, and upon releasing manual pressure on the spindle the spring means 30 urges plate 22 toward the opposite base, thus securely holding the spindle therebetween.

By way of non-limiting example, the thickness of each base 14 and 15 may be 0.75 inch, and the spindle should be so trimmed in width that a 4/32 inch clearance is provided at each end between the base and the spindle when assembled. Preferably the spring means is of a type which folds flat when in fully compressed position with the coils nesting inside one another. Alternatively, one or more leaf spring means could be provided.

The bases of the invention may be provided in several sizes to accommodate spindles of various sizes. The bases may readily be fabricated from wood using standard wood-working equipment such as routers and the like. The outer surface of the socket portions may of course be configured in various ornamental patterns compatible with the style of spindle to be used. The bases could also be formed by injection molding, preferably using a molding compound which will take stain and thus simulate the appearance of wood.

Modifications may be made without departing from the spirit and scope of the invention, and no limitations are to be inferred except as set forth in the appended claims.

I claim:

1. A base for releasably securing a spindle in a desired position, the spindle having planar top and bottom surfaces, said base comprising a socket member having substantially parallel, generally planar inner and outer surfaces when in the installed position, the perimeter of said inner surface in the installed position being less than the perimeter of said outer surface, an opening centrally of said inner surface dimensioned and configured to receive an end of said spindle, a passage centrally of said outer surface having a greater area than said opening in said inner surface, a shoulder having an inwardly facing right angle defining the intersection of said opening and said passage, a plate within said passage having substantially the same configuration as said passage and movable therein into abutment with said shoulder, a planar closure member secured to said outer surface of said socket member and underlying said passage when in the installed position, spring means in said passage between said movable plate and said closure member urging said plate into engagement with said shoulder, a bore centrally of said closure member through which fastening means may be inserted for securing said base in a desired location, and an access opening centrally of said movable plate facilitating installation of said fastening means from said inner surface of said socket member.

2. A pair of bases for releasably securing a spindle in a desired position, the spindle having planar top and bottom surfaces, one base of said pair comprising a socket member having substantially parallel, generally planar inner and outer surfaces when in the installed position, the perimeter of said inner surface in the installed position being less than the perimeter of said outer surface, an opening centrally of said inner surface dimensioned and configured to receive an end of said spindle, a passage centrally of said outer surface having a greater area than said opening in said inner surface, a shoulder having an inwardly facing right angle defining the intersection of said opening and said passage, a plate within said passage having substantially the same configuration as said passage and movable therein into abutment with said shoulder, a planar closure member secured to said outer surface of said socket member and underlying said passage when in the installed position, spring means in said passage between said movable plate and said closure member urging said plate into engagement with said shoulder; the other base of said pair comprising a socket member having substantially planar inner and outer surfaces when in the installed position, the perimeter of said outer surface in the installed position being greater than the perimeter of said inner surface, an opening centrally of said inner surface dimensioned and configured to receive an end of said spindle, a recess within said socket member intersecting said opening and having a greater area than said opening, a shoulder having an inwardly facing right angle defining the intersection of said opening and said recess, said recess terminating in a planar surface intermediate said inner and outer surfaces of said socket member, and a circular bore in said other base centrally of said outer surface of less area than that of said opening in said inner surface and intersecting said recess, said bore being adapted to accommodate fastening means inserted therethrough for securing said other base in a desired location.

3. The pair of bases claimed in claim 2, wherein said passage and said opening in said one base and said opening in said other base have the same configuration.

4. The pair of bases claimed in claim 3, wherein said passage and said opening in said one base and said opening in said other base are square.

5. The pair of bases claimed in claim 3, wherein said passage and said opening in said one base and said opening in said other base are circular.

* * * * *